(12) United States Patent
Markey

(10) Patent No.: US 6,374,620 B1
(45) Date of Patent: Apr. 23, 2002

(54) PRESSURE EQUALIZATION PORT

(75) Inventor: Ralph Markey, Asheville, NC (US)

(73) Assignee: OPX Corporation, Muskegon, MI (US)

( * ) Notice: Subject to any disclaimer, the term of this patent is extended or adjusted under 35 U.S.C. 154(b) by 0 days.

(21) Appl. No.: 09/838,871

(22) Filed: Apr. 23, 2001

(51) Int. Cl.[7] ............................................... F25D 17/06
(52) U.S. Cl. ............................................ 62/89; 62/410
(58) Field of Search ......................... 62/409, 410, 89; 137/845

(56) References Cited

U.S. PATENT DOCUMENTS

| | | | |
|---|---|---|---|
| 3,813,896 A | * 6/1974 | Lebahn | 62/409 |
| 5,254,120 A | * 10/1993 | Cinberg et al. | 606/109 |
| 5,466,239 A | * 11/1995 | Cinberg et al. | 606/109 |
| 5,499,514 A | * 3/1996 | Ho | 62/410 |
| 5,836,170 A | * 11/1998 | Perkins et al. | 62/409 |
| 6,176,776 B1 | * 1/2001 | Finkelstein et al. | 62/409 |

* cited by examiner

*Primary Examiner*—William E. Tapolcai
*Assistant Examiner*—Mohammad M. Ali
(74) *Attorney, Agent, or Firm*—Baker & Hostetler LLP

(57) ABSTRACT

Methods and apparatus for pressure equalization port devices, which are particularly suited for preventing vacuum seals in ultra low freezers are disclosed. An application of the pressure equalization port method and apparatus to ultra low freezers is also disclosed.

38 Claims, 4 Drawing Sheets

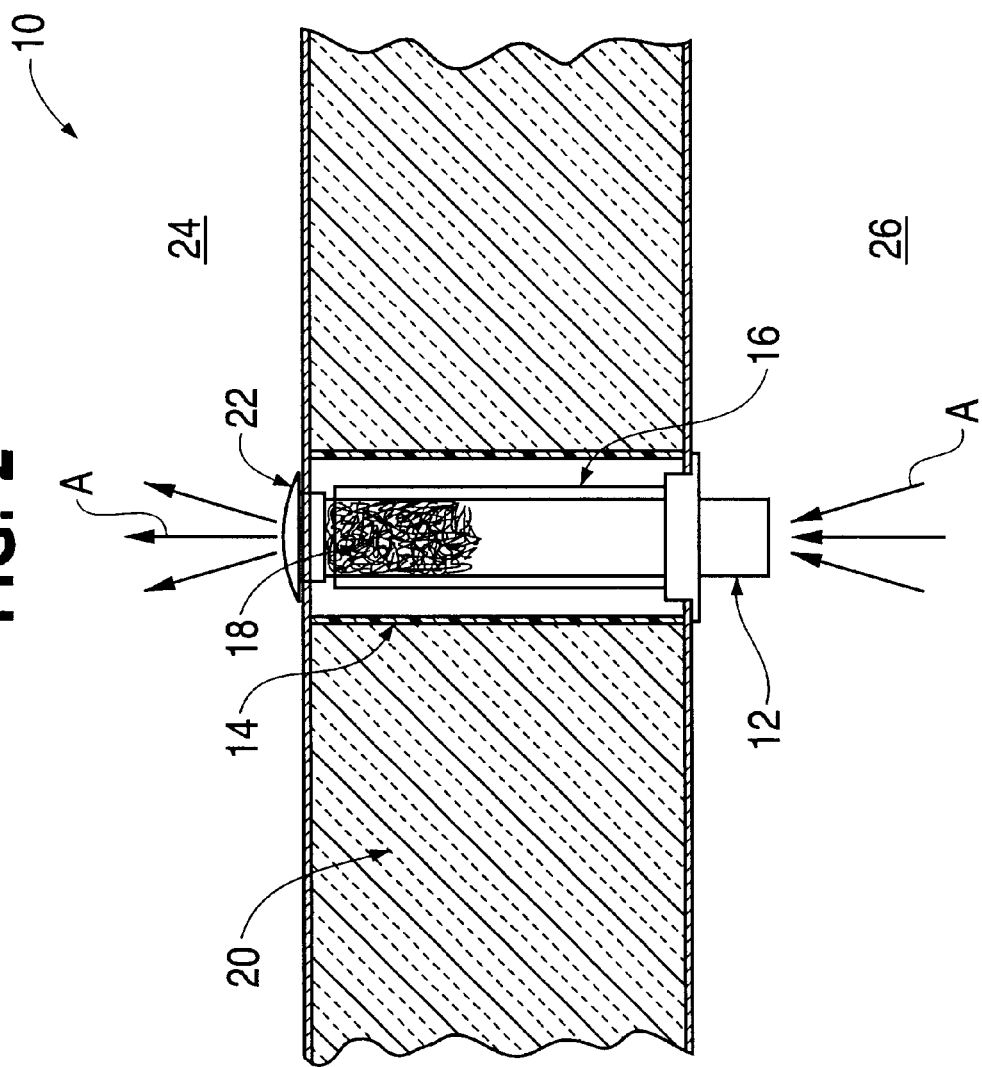

PRESSURE EQUALIZATION PORT

FIELD OF THE INVENTION

The present invention relates generally to pressure equalization ports. More particularly, the present invention relates to a pressure equalization port to prevent vacuum seal in ultra low freezers.

BACKGROUND OF THE INVENTION

A well known problem with refrigeration equipment is that room temperature air is exchanged with cold air in the freezer when the door is open. When the door is closed the room temperature air cools down, contracts, and causes a vacuum seal of the door. The door is then difficult to open until the pressure inside the freezer equalizes with the pressure outside the freezer.

Pressure equalization ports and other pressure equalization devices serve the purpose of reducing the time required to open a pressurized door for an ultra low freezer or other pressurized devices. This time differential can be from over 5 minutes without a pressure equalization port to 15 to 40 seconds with a pressure equalization port being present depending on pressure and port size. By reducing the amount of time for accessing the pressurized environment, users do not have to waste time and/or energy when opening pressurized doors. Pressure equalization ports therefore alleviate, to some extent, the need for pressurized doors to have bulky or cumbersome door opening mechanisms.

To improve operation, pressure equalization ports may also heat the incoming air within the pressure equalization port. This creates more of a pressure gradient between the cooler or unheated air on one side of the pressure equalization port which is at a lower pressure and the warmer outside incoming heated air which is at a higher pressure. This pressure gradient causes the air at higher pressure to circulate through the pressure equalization port and into the air at lower pressure until a balance or equalization of pressure is achieved. The introduction of heat within the pressure equalization port serves to expedite this process since pressure increases as temperature increases given a constant or fixed volume. Once pressure equalization occurs, any vacuum seal that may be present will be broken.

Numerous methods and devices have been developed to improve the pressure equalization process. For example, in the prior art (see FIGS. 1A & 1B) a pressure equalization port may include a stainless steel pressure equalization tube 1, a beater element 2, a valve/heater housing 3, and a split rubber valve 4. This pressure equalization port has several disadvantages. The split rubber valve 4 tends to stretch after several uses and therefore loses its seal. The heater element 2 extends into the pressure equalization tube 1 with a gap of over 0.15 inches between the heater element 2 and the stainless steel pressure equalization tube 1 resulting in a low heat transfer rate when heating the incoming high pressure air A'.

Furthermore, both the heater element 2 and the pressure equalization tube 1 extend and terminate inside the freezer cabinet 5 interior which clearly does not help in freezer performance, i.e., the heater element 2 is heating up the freezer's interior (see FIG. 1A). Furthermore, the known thermal conductivity of the prior art stainless steel pressure equalization tube 1 is within the range of 9 to 30 (W/m·k) which is relatively low and results in the low heat transfer rate mentioned above.

This low heat transfer rate reduces the pressure gradient created between the low pressure end and the high pressure end of the pressure equalization port resulting in a slightly slower pressure equalization. Also, it should be noted that the heater element 2 may serve the purpose or function of preventing any accumulated condensation on the low pressure side of the pressure equalization port from clogging or interfering with air flow through the pressure equalization port. Therefore, it would be beneficial to use a high heat transfer material, such as aluminum or copper in conjunction with a heater.

While the currently developed pressure equalization ports provide advantages over previous systems, they still suffer drawbacks. The primary drawbacks are the uneven heating of the incoming air and extending both the heater and the pressure equalization tube into the freezer cabinet interior resulting in heating the freezer's interior as well. Because of the thermodynamic characteristics of a freezer, any interjection of a heat source therein would lower the efficiency and/or performance of the freezer. A need still exists, therefore, for a pressure equalization port which can be used to prevent vacuum seal in an ultra low freezer and which will not affect overall freezer performance.

SUMMARY OF THE INVENTION

The foregoing needs have been satisfied to a great extent by the present invention wherein, in one aspect of the invention, a pressure equalization port is provided having a metal tube mounted within an insulated wall, e.g., an ultra low freezer cabinet wall. The tube having an outside end protruding outside the wall toward a high pressure area and an inside end mounted behind an insulating nylon bushing. The tube is terminated about 0.15 inches below the surface of the inside wall facing toward a low pressure area.

This pressure difference creates a pressure gradient which results in air flow from the high pressure area to the low pressure area. A vent is provided within the low pressure area and is mounted on the inside end of the metal tube. A heater surrounds the metal tube in order to supply evenly distributed heat transfer to the incoming air. Metal wool is placed within the metal tube at the inside end for additional heat transfer of the incoming air. The heating of the incoming air insures the flow of incoming and to impede the natural flow of air once pressure equalization is attained. By maintaining an environment above freezing, any collected condensation will not freeze thereby allowing the air to flow uninhibited.

In another aspect of the invention, a pressure equalization port is mounted within an insulated wall of a sealed chamber, having a non-conductive exterior tube, a conductive interior tube which is mounted within the non-conductive exterior tube. The conductive interior tube includes an end exposed to a high pressure area and an end exposed to a low pressure area. A heater is also mounted within the non-conductive tube and the heater surrounds the conductive interior tube, The insulated wall is exposed to a pressure gradient with the low pressure area on one side of the insulated wall and the high pressure area on the other. This pressure gradient causes air to flow from the high pressure area to the low pressure area through the conductive interior tube.

A method of equalizing pressure is yet another aspect of the invention, in which a non-conductive tube is mounted within an insulated wall of a chamber. Next, a conductive tube is mounted within the non-conductive tube. One end of the non-conductive tube and one end of the conductive tube are mounted substantially flush with an inside wall of the chamber. The conductive tube is then heated and an end of the conductive tube is exposed to a low pressure area and the other end of the conductive tube is exposed to a high pressure area, thereby creating a pressure gradient across the conductive tube which causes air to flow through the conductive tube from the high pressure area to the low pressure area.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology land terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is an illustration of the pressure equalization port showing a preferred embodiment of the present invention.

DETAILED DESCRIPTION OF PREFERRED EMBODIMENTS OF THE INVENTION

Figure 1A:
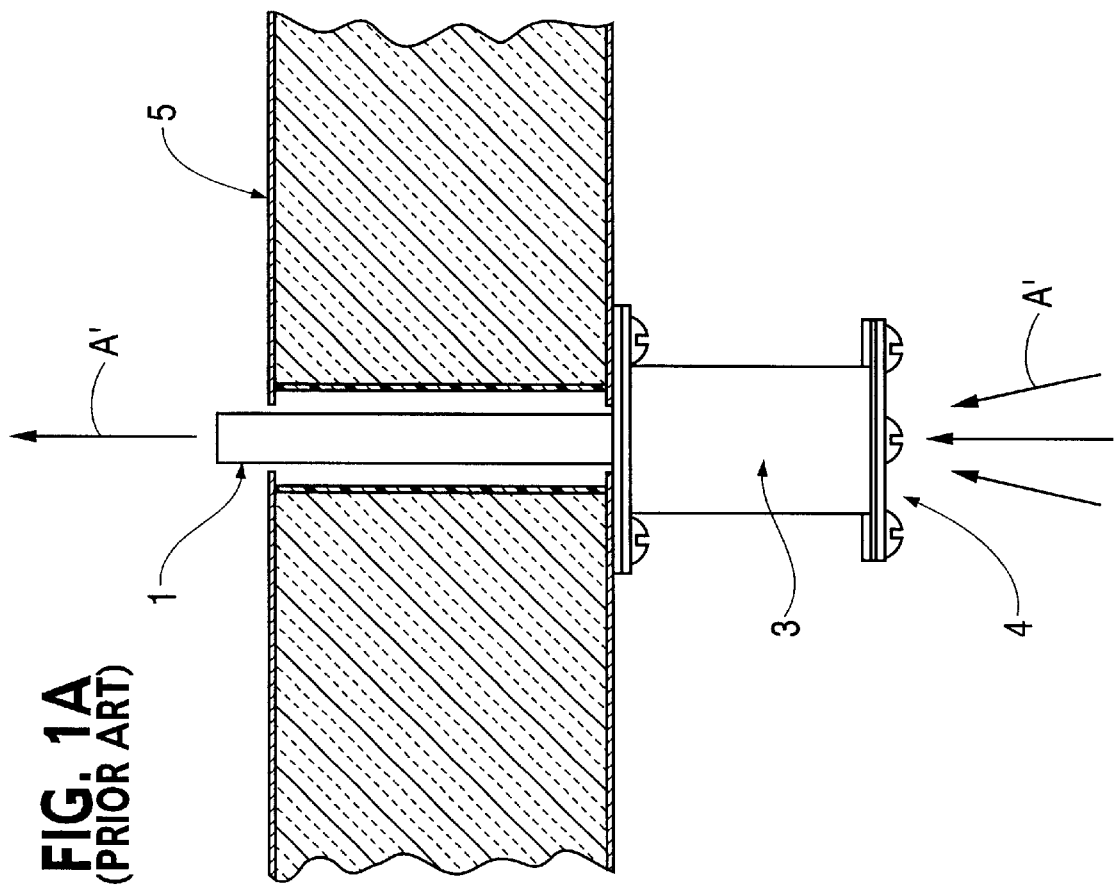
FIG. 1A is an illustration, of a prior art pressure equalization port mounted in a freezer cabinet.
Figure 1B:
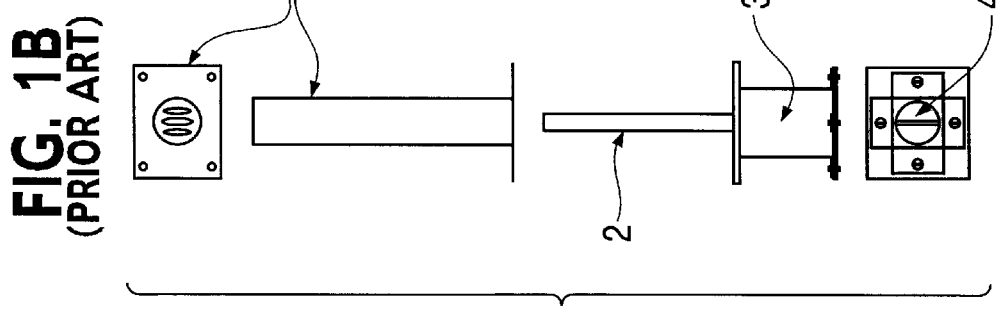
FIG. 1B is an illustration of an exploded view of the pressure equalization port of FIG. 1A.
Figure 3:
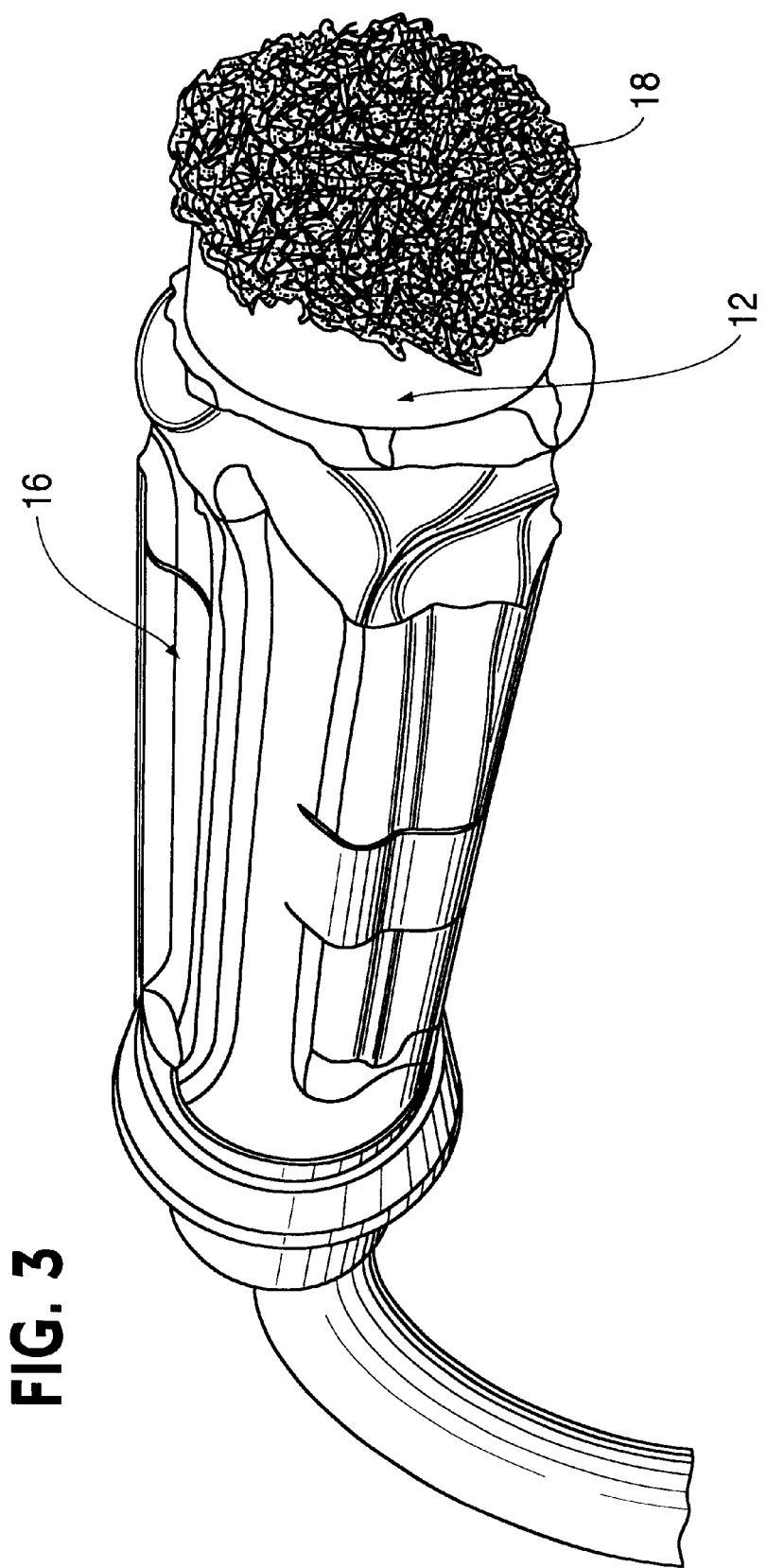
FIG. 3 is a perspective view of the pressure equalization port of FIG. 2 showing the copper wool.
Figure 4:
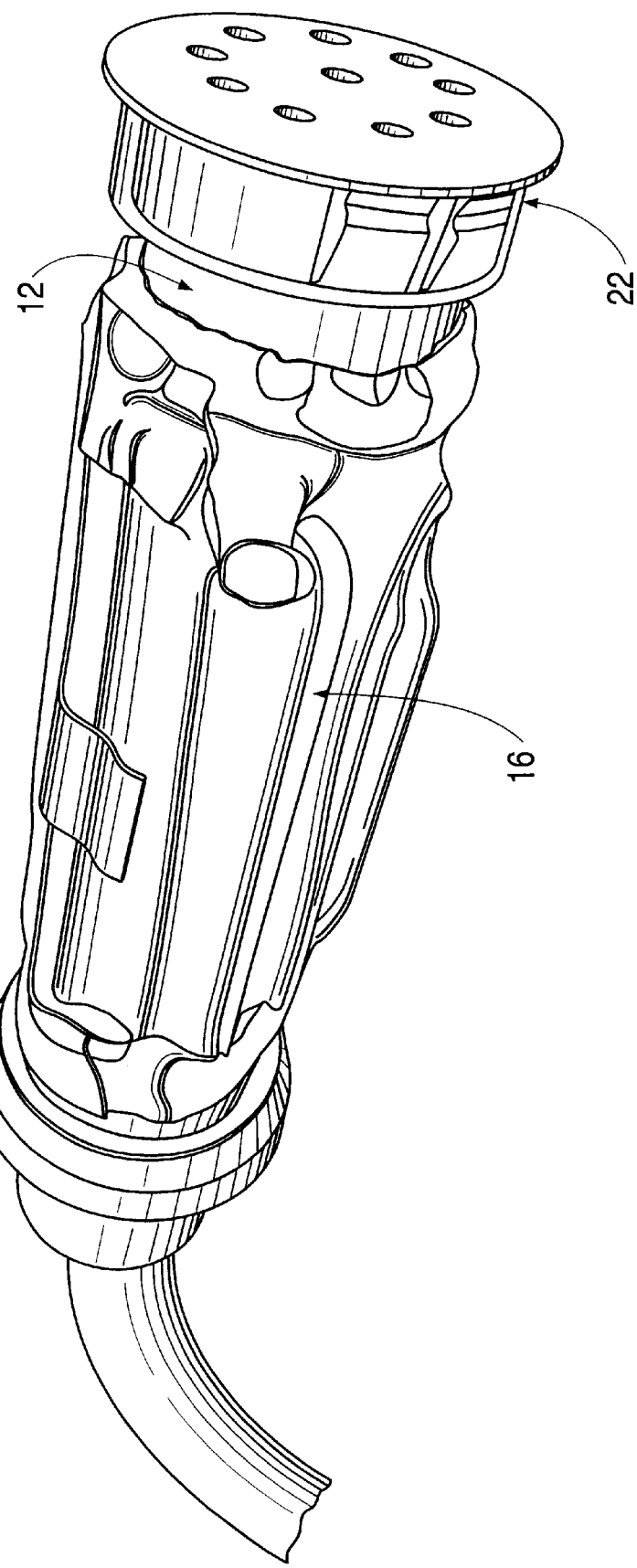
FIG. 4 is another perspective view of the pressure equalization port of FIG. 2 showing the vent cap.

Referring now to the figures, wherein like reference numerals indicate like elements, in FIG. 2 there is shown a pressure equalization port 10 in accordance with a preferred embodiment of the present invention. The pressure equalization port 10 includes a conductive interior tube 12, preferably made of aluminum; a non-conductive exterior tube 14, preferably the PVC type; a heater 16, preferably an electric type; metal wool 18, preferably made of copper; and a non-conductive vent 22, preferably made of nylon.

The non-conductive exterior tube 14 is mounted within an insulated wall 20 of a closed or sealed chamber (not shown) exposed to a low pressure area 24 on one side and a high pressure area 26 on the other, e.g., an ultra low freezer cabinet wall. The conductive interior tube 12 is mounted within the non-conductive exterior tube 14 and has an end which protrudes longitudinally outside of both the non-conductive exterior tube 14 and the insulated wall 20 and into the high pressure area 26 (see FIG. 2). The other end of the conductive interior tube 12 is mounted about 0.15 inches from the low pressure side of the insulated wall 20. The heater 16 surrounds the conductive interior tube 12 in order to provide even heat transfer throughout the conductive interior tube 12 to ambient incoming air A entering the conductive interior tube 12 from the high pressure area 26 to the low pressure area 24. Heater 16 also prevents ice build-up within and around the non-conductive vent 22.

Furthermore, metal wool 18 is inserted into the other end of the conductive interior tube 12 which is adjacent to the low pressure area 24. This metal wool 18 provides additional heat transfer to the incoming air A, thereby increasing the air flow. Metal wool 18 also allows air flow during pressure imbalance but minimizes or inhibits any air flow during any normal or ambient pressure state condition. The non-conductive vent 22 prevents any heat transfer to substantially occur: between the low pressure area 24 and the conductive interior tube 12, while still providing air flow to pass.

Pressure equalization ports can be any device that is capable of allowing a pressure gradient to balance or equalize itself from one side of the port to the other over a short period of time. Preferred examples of the pressure equalization ports are utilized in high altitude aircraft, spacecraft, submarines, ultra low, freezers, refrigeration systems or other devices in which a need exists for speedy pressure equalization due to a pressure gradient being present between an exterior area and an interior area. It should be readily apparent that the foregoing examples of pressure equalization ports are merely illustrative and are not meant to be limiting.

In one preferred embodiment that is particularly suited to the present invention, the pressure equalization port 10 creates a pressure gradient between the low pressure area 24 and the high pressure area 26. This pressure gradient occurs between the two ends of the conductive interior tube 12. The surrounding heater 16 evenly warms the incoming air resulting in increased pressure within the conductive interior tube 12 and thus an increased air flow of incoming air A from the high pressure area 26 to the low pressure area 24 until a balance or pressure equalization on both ends of the pressure equalization port 10 is realized. This pressure increase may be slight but is clearly supported by the thermodynamics of pressure increasing as temperature increases oven a constant or fixed volume such as the conductive interior tube 12.

In the presently preferred embodiment, the efficiency of the heat transfer between the conductive interior tube 12 and the heater 16 is essential in expediting the process of pressure equalization. In a particularly preferred embodiment the introduction of metal wool 18 within the low pressure end of the conductive interior tube 12 assists in heating the incoming air in that the air is forced to weave through the metal wool 18 due to the pressure gradient.

In another preferred embodiment the conductive interior tube 12 is made from a material, such as aluminum, with a high thermal conductivity in the range of 200 to 300 (W/m·K). This high thermal conductivity causes a correspondingly high heat transfer rate between the conductive interior tube 12 and the incoming air flow A from the high pressure area 26 resulting in an increased pressure gradient between the low pressure area 24 and high pressure area 26. Thus, air flow is increased and pressure equalization is expedited.

In addition, the preferred metal wool 18 is made from a material, such as copper wool, with a high thermal conductivity in the range of 300 to 500 (W/m·K). This high thermal conductivity causes a correspondingly high beat transfer rate between the conductive interior tube 12, metal wool 18, and the incoming air flow A from the high pressure area 26 resulting in an even larger pressure gradient between the low pressure area 24 and high pressure area 26. Thus, incoming air flow A is increased and pressure equalization is expedited at an even higher rate and efficiency.

Furthermore, the non-conductive vent 22 is made from a material, such as nylon, with a low thermal conductivity in the range of 0.1 to 1.0 (W/m·K). This low thermal conductivity insulates both the conductive interior tube 12 and the heater 16 from transferring heat to the low pressure area 24, e.g., an interior area of an ultra low freezer.

It is envisioned that pressure equalization port 10 can be mounted to the cabinet wall of refrigeration systems, e.g., an ultra low freezer, and thus provide a mechanism for preventing vacuum seals, especially when it comes to opening doors of these refrigeration systems.

Advantages of each of these embodiments will be readily understood. For example, the former embodiment may be preferred for pressure gradients where a low vacuum seal needs to be prevented or broken (e.g., refrigeration systems). The latter embodiment may be preferred, however, for use by individuals who utilize ultra low freezers and the like which have pressure gradients where a high vacuum seal needs to be prevented or broken and therefore, require a more expeditious pressure equalization port as described above.

The above description and, drawings are only illustrative of preferred embodiments which achieve the objects, features, and advantages of the present invention, and it is not intended that the present invention be limited thereto. Any modification of the present invention which comes within the spirit and scope of the following claims is considered to be part of the present invention.

What is claimed is:

1. A pressure equalization port mounted within an insulated wall of a sealed chamber, comprising:
   a non-conductive exterior tube;
   a conductive interior tube mounted within said non-conductive exterior tube, said conductive interior tube includes an end exposed to a high pressure area and an end exposed to a low pressure area; and
   a heater mounted within said non-conductive tube and said heater surrounds said conductive interior tube,
   wherein said insulated wall is exposed to a pressure gradient with said low pressure area on one side of the insulated wall and said high pressure area on the other, said pressure gradient causing air to flow from the high pressure area to the low pressure area through said conductive interior tube.

2. The pressure equalization port of claim 1, wherein said conductive interior tube has an end which is mounted about 0.15 inches from the low pressure side of said insulated wall.

3. The pressure equalization port of claim 1, wherein said conductive interior tube extends from said insulated wall into the high pressure area.

4. The pressure equalization port of claim 2, wherein said conductive interior tube includes a non-conductive vent mounted on the low pressure end of said conductive interior tube.

5. The pressure equalization port of claim 4, wherein a metal wool is disposed within the low pressure end of said conductive interior tube.

6. The pressure equalization port of claim 5, wherein metal wool is copper wool.

7. The pressure equalization port of claim 4, wherein said non-conductive vent is made of nylon.

8. The pressure equalization port of claim 1, wherein said conductive interior tube is aluminum.

9. The pressure equalization port of claim 1, wherein said heater is an electric heater.

10. The pressure equalization port of claim 1, wherein said non-conductive exterior tube is a PVC tube.

11. The pressure equalization port of claim 4, wherein said non-conductive vent has a thermal conductivity within the range of 0.1 to 1.0 (W/m·K).

12. The pressure equalization port of claim 1, wherein said conductive interior tube has a thermal conductivity within the range of 200 to 300 (W/m·K).

13. The pressure equalization port of claim 5, wherein said metal wool has a thermal conductivity within the range of 300 to 500 (W/m·K).

14. The pressure equalization port of claim 4, wherein said heater substantially eliminates the opportunity for ice build-up within and around said non-conductive vent.

15. The pressure equalization port of claim 5, wherein said metal wool impedes the natural how of air within said conductive interior tube.

16. The pressure equalization port of claim 1, wherein said sealed chamber is a refrigeration chamber.

17. The pressure equalizing port of claim 1, wherein said sealed chamber is an ultra low freezer chamber.

18. A method of equalizing pressure, comprising the steps of:
    mounting a non-conductive tube within an insulated wall of a chamber;
    mounting a conductive tube within said non-conductive tube;
    mounting one end of said non-conductive tube and one end of said conductive tube substantially flush with an inside wall of said chamber;
    heating said conductive tube; and
    exposing an end of said conductive tube to a low pressure area and the other end of said conductive tube to a high pressure area, thereby creating a pressure gradient across said conductive tube causing air to flow through said conductive tube from said high pressure area to said low pressure area.

19. The method of claim 18, further comprising the steps of:
    mounting a non-conductive vent on the low pressure end of said conductive tube.

20. The method of claim 18, further comprising the steps of:
    inserting metal wool within said conductive tube proximate the low pressure end.

21. The method of claim 18, wherein said conductive tube has a thermal conductivity within the range of 200 to 300 (W/m·K).

22. The method of claim 20, wherein said metal wool has a thermal conductivity within the range of 300 to 500 (W/m·K).

23. The method of claim 19, wherein said non-conductive vent has a thermal conductivity within the range of 0.1 to 1.0 (W/m·K).

24. A pressure equalization port mounted within an insulated wall of a sealed chamber, comprising:
    means for causing air to flow from a high pressure area to a low pressure area through a conductive interior tube having two ends which is mounted within a non-conductive exterior tube having two ends;
    means for impeding said air flow within said conductive interior tube when pressure becomes equalized between the low pressure area and the high pressure area: and means for preventing condensation to freeze and accumulate on the low pressure end of said conductive interior tube.

25. The pressure equalization port of claim 24, wherein said conductive interior tube has an end which is mounted about 0.15 inches from the low pressure side of said insulated wall.

26. The pressure equalization port of claim 24, wherein said conductive interior tube extends from said insulated wall into the high pressure area.

27. The pressure equalization port of claim 25, wherein said conductive interior tube includes a non-conductive vent mounted on the low pressure end of said conductive interior tube.

28. The pressure equalization port of claim 27, wherein said means for impeding said air flow within said conductive interior tube is a metal wool disposed within the low pressure end of said conductive interior tube.

29. The pressure equalization port of claim 28, wherein said metal wool is copper wool.

30. The pressure equalization port of claim 27, wherein said non-conductive vent is made of nylon.

31. The pressure equalization port of claim 24, wherein said conductive interior tube is aluminum.

32. The pressure equalization port of claim 24, wherein said means for preventing condensation to freeze and accumulate is an electric heater.

33. The pressure equalization port of claim 24 wherein said non-conductive exterior tube is a PVC tube.

34. The pressure equalization port of claim 27, wherein said non-conductive vent has a thermal conductivity within the range of 0.1 to 1.0 (W/m·K).

35. The pressure equalization port of claim 24, wherein said conductive interior tube has a thermal conductivity within the range of 200 to 300 (W/m·K).

36. The pressure equalization port of claim 28, wherein said mew wool has a thermal conductivity within the range of 300 to 500 (W/m·K).

37. The pressure equalization port of claim 24, wherein said sealed chamber is a refrigeration chamber.

38. The pressure equalization port of claim 24, wherein said sealed chamber is an ultra low freezer chamber.

* * * * *

UNITED STATES PATENT AND TRADEMARK OFFICE
CERTIFICATE OF CORRECTION

PATENT NO.    : 6,374,620 B1
DATED         : April 23, 2002
INVENTOR(S)   : Ralph Markey It is certified that error appears in the above-identified patent and that said Letters Patent is hereby corrected as shown below:

Title page,
Item [73], please change the Assignee's name from "OPX Corporation" to -- SPX Corporation --.

Signed and Sealed this

Seventeenth Day of December, 2002

JAMES E. ROGAN
*Director of the United States Patent and Trademark Office*